June 13, 1939.  H. E. MADDEN  2,162,093
FUEL CONSUMPTION MEASURING APPARATUS
Filed Aug. 9, 1938   2 Sheets-Sheet 1
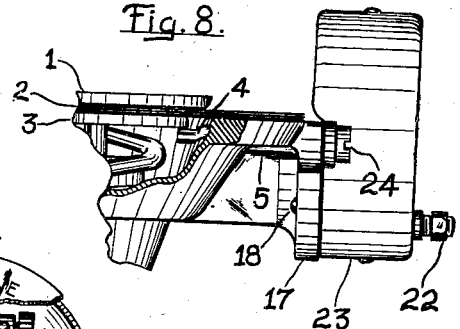
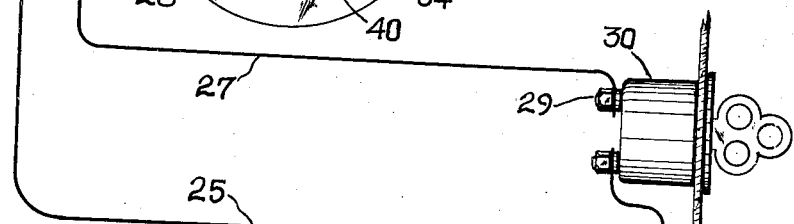
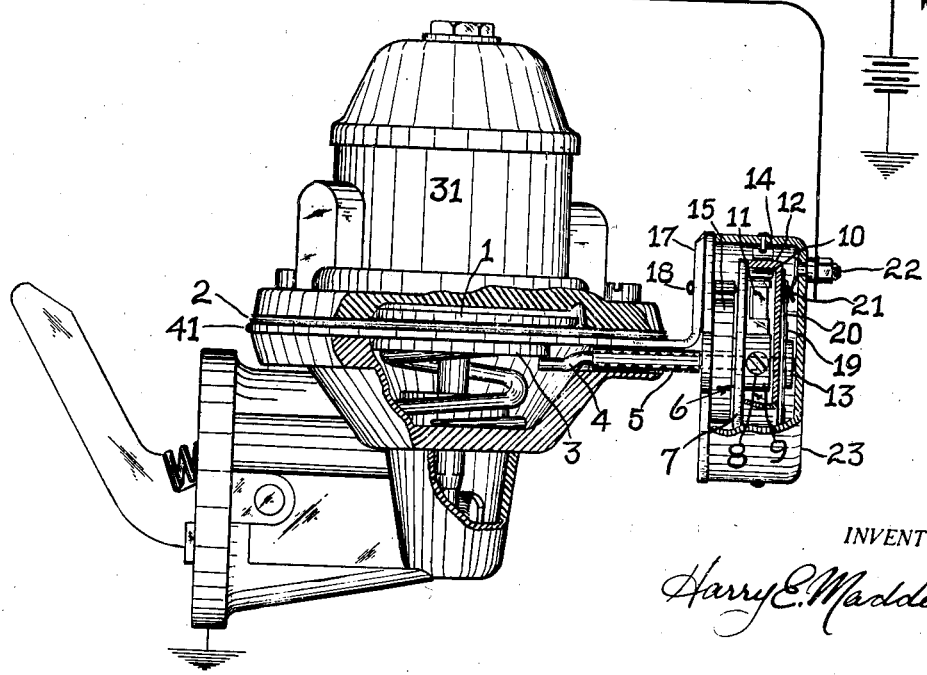
INVENTOR.
Harry E. Madden June 13, 1939.  H. E. MADDEN  2,162,093
FUEL CONSUMPTION MEASURING APPARATUS
Filed Aug. 9, 1938  2 Sheets-Sheet 2
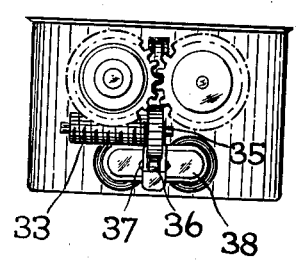
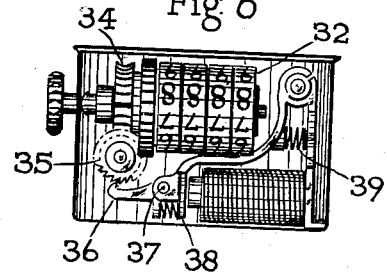
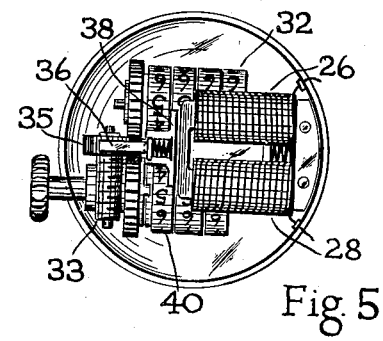
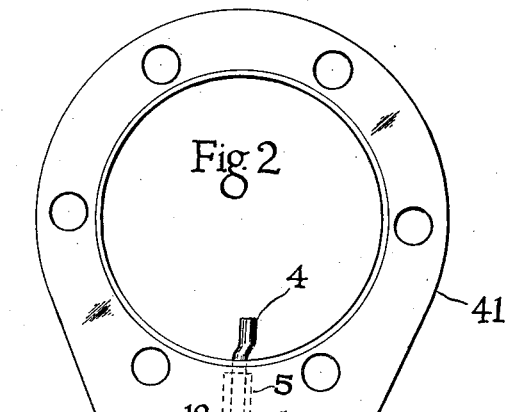
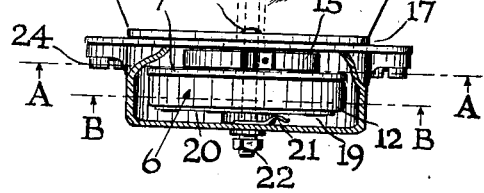
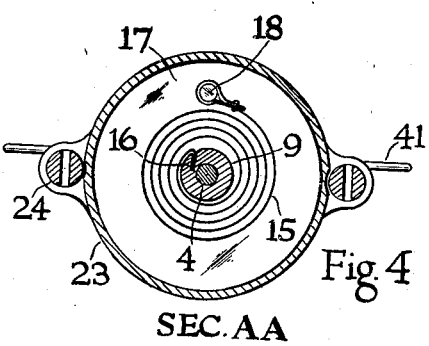
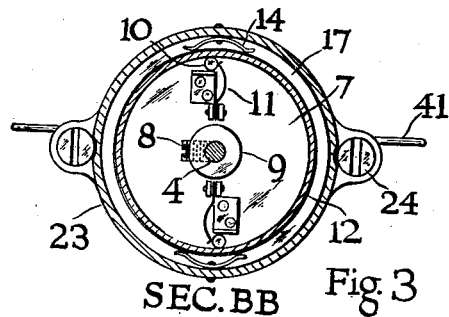
INVENTOR.
Harry E. Madden Patented June 13, 1939

2,162,093

UNITED STATES PATENT OFFICE 2,162,093

FUEL CONSUMPTION MEASURING APPARATUS

Harry E. Madden, Norwood, Pa.

Application August 9, 1938, Serial No. 223,919

3 Claims. (Cl. 73—198)

This invention relates to fluid meters and particularly to the metering or recording of the amount of fluid moved, or delivered to a terminal point, by the mechanical fuel pump of the pulsating, flexible diaphragm type.

An object of this invention is to produce, in combination with a pulsating, flexible diaphragm type fuel pump, a reliable measuring apparatus of inexpensive construction.

Novel means for accomplishing this purpose includes a movement pick-up device actuated by the movement of the fuel pump diaphragm said means terminating in a rotatable member caused to rotate progressively said rotation being an exact magnification of the pumping movement of the fuel pump diaphragm. Means for metering or recording said movement including a counter group or register, said means being an exact de-magnification of said magnified movement of said pumping diaphragm. Calibration of the metering or recording group represents the United States standard liquid measure of 231 cubic inches. Volume displacement of the aforesaid fuel pump diaphragm movement being the variable fraction of said standard measure.

The object of the invention, including embodiment of mechanical detail, will be understood by referring to the following specification and accompanying drawings wherein:

Fig. 1 is a diagrammatic view of a preferred embodiment of the invention, partly in broken section, illustrating the adaptation of the invention to a fuel pump of standard construction for automotive purpose.

Fig. 2 is a plan view of the movement pick-up device illustrated in Fig. 1.

Fig. 3 is a sectional view on the plane B—B Fig. 2.

Fig. 4 is a sectional view on the plane A—A Fig. 2.

Fig. 5 is a rear plan view of the register illustrated in Fig. 1.

Fig. 6 is a top elevational view of the same.

Fig. 7 is a left side elevational view of the same.

Fig. 8 is a fragmentary view, partly in broken section, of the lower half of the fuel pump casing, illustrating a built-in construction of permanent design.

In the drawings, reference characters 1—2—3 designate the component parts of the pumping diaphragm of the mechanical fuel pump, 1 being the upper metallic cup, 2 the flexible diaphragm and 3 the lower metallic cup which is made to bear upon and actuate the crank shaft member 4 which is supported by a bearing 5. At its other end, the crank shaft 4 supports a roller clutch 6 consisting of an oscillating disk 7, which is secured to the crank shaft 4 by a set screw 8 through the hub 9, two roller clutch pins 10, two retaining springs 11 and a rotatable cup shaped member 12 loosely supported on the crank shaft 4 by a hub 13.

The action of the clutch 6 (as shown in Fig. 3) is similar to the conventional, roller type of clutch wherein the gripping or clutch action is the resultant of pressure exerted radially through the wedge like action of the cylindrical members 10 retained by the pressure of springs 11 for instant gripping between the wedging facets of the driving element 7 and the opposing surface of the driven member 12.

The downward, or suction movement of the pump diaphragm 1—2—3 is transmitted to the oscillating disk 7 by the crank shaft 4, said movement being magnified in proportion to the ratio of the radius of the roller clutch 6 to the radius, or throw, of the crank shaft 4. The gripping action of the clutch pins 10 being directional in action of the clutch, and held in position by the retaining springs 11, will cause a similar or corresponding movement of the rotatable clutch member 12. At the end of the movement and during the reverse movement, the rotatable clutch member 12 will be retained in position by the action of the brake springs 14, while the movement of the crank-shaft 4 and oscillating disk 7 will be reversed to follow the upward movement of the diaphragm member 3, this reversing or following movement being the resultant of pressure applied by a spiral spring 15 secured, by its one end, to the hub 9 of the oscillating disk 7 by a slot 16 and its other end, to the frame 17 by an anchor pin 18.

To the outside face of the free-running clutch member 12 there is secured, by a circle of flat-head rivets 19, an insulating disk. A spring-bronze contactor 21 attached to a binding-post 22, that extends through a Bakelite cover 23, is made to bear upon the insulating disk 20 at a point in line with the circle of flat-head rivets 19. The Bakelite cover 23 is attached to the frame 17 by screws 24.

An electrical conductor 25, of suitable capacity, is connected between the binding-post 22 in the Bakelite cover 23, and one winding of the electromagnet 26. A similar conductor 27 is connected between the second winding of the electromagnet 28 and a suitable point 29 from which current may be drawn. As illustrated in Fig. 1, the key switch 30 represents a standard ignition switch.

Assuming the circuit, as illustrated in Fig. 1, to be functioning normally, that is, key switch 30 closed and fuel pump 31 in operation, there will be an intermittent opening and closing of the electrical circuit as the rotating clutch member 12, carrying the insulating disk 20 and flathead rivets 19, rotates, progressively, past the spring-bronze contactor 21.

The counter group (as illustrated in the drawings) is of standard construction containing two banks of numerical counter wheels arranged in parallel. The initial counter wheel 40, preferably finished in a contrasting color, registers fractional parts of the unit liquid measure and requires one full turn or unit recording to move the adjacent counter wheel one full numerical division; and, as so provided, will record cumulatively ninety-nine and nine-tenths units on the lower, or three counter, bank; this may be re-set through the external, knurled screw, re-set means to a zero reading. The upper bank of four counter wheels, connected through suitable gearing to the initial counter wheel 40, will record cumulatively a total of nine-thousand, nine-hundred and ninety-nine units and is not provided with re-set means.

Rotation of the counter group 32 is through a worm 33 and worm-wheel 34 drive, there being fixed rigidly to the worm 33 a ratchet wheel 35 the teeth of which are engaged by a pawl 36 attached, in a pivotal manner by a pin 37, to the loosely pivoted armature 38 of the electromagnet 26—28. The closing of the circuit, as previously described, energizes said electromagnet 26—28 and attracts the armature 38 completing, thereby, the work-cycle of the ratchet movement. The opening of the circuit permits a spring 39 to retract the armature 38 and pawl 36 said means completing the reverse-cycle of the movement.

Obviously then, from the foregoing description, it will be seen that the pumping movement of the fuel pump diaphragm 1—2—3 as magnified by the movement of the rotating clutch member 12, will be effectively transmitted to result in a reduced movement of the initial counter, or register wheel 40, in proportion to the number of rivets 19 used in the circle; in the number of teeth used in the ratchet wheel 35; and the ratio of the worm 33 and worm-wheel 34.

Means for mounting the fuel pump member (Fig. 2), as illustrated in Fig. 1, is by a metallic plate 41 of suitable thickness to which is rigidly attached, on its underside, the shaft bearing 5 while the upper side being flat and in contact with the flexible diaphragm 2 forms the seal for the upper casing of the fuel pump; also, as shown in Fig. 1, one end is extended and bent rightangled to form the frame 17; plate 41 is drilled, or punched, as shown in Fig. 2, to provide openings that will match the fuel pump to which it is attached. The lower section of the fuel pump case must be suitably indented to receive the shaft bearing 5 as shown in Fig. 1.

A modified form, providing means for mounting the fuel pump member, is illustrated in Fig. 8 which shows a fragmentary section of the lower case of the fuel pump suitably altered to provide, as an integral part of the case, the shaft bearing 5 and the frame 17, obviously, eliminating the metallic plate 41.

I claim:

1. In a device for measuring the fuel consumption of an internal combustion engine, a fuel pump having a diaphragm for pumping fuel to the engine, a member contacting said diaphragm to be moved thereby, means for urging said member into contact with said diaphragm, a one-way drive operated by said member, a counter, and means controlled by said drive for operating said counter.

2. In a device for measuring fuel consumption, a fuel pump having a flexible reciprocating pumping diaphragm, connecting means operable for magnifying without loss of movement the reciprocal movement of said pumping diaphragm, said means comprising a crank member in active contact with said diaphragm, means yieldably sustaining said crank member in active contact with said diaphragm, a frictional roller clutch comprising an oscillating driving disc rigidly secured to said crank member, frictional clutch means yieldably sustained for instant gripping, a rotating driven member operated by said frictional clutch means, and means operable for preventing retrograde movement of said rotating driven member, a counter, and means controlled by the rotating driven member for operating said counter.

3. In a device for measuring fuel consumption, a fuel pump having a flexible reciprocating pumping diaphragm, a shaft having a crank contacting said diaphragm, means for urging said crank into contact with said diaphragm, a one-way clutch driven by said shaft, a counter, and means controlled by said clutch for operating said counter.

HARRY E. MADDEN.